Aug. 19, 1924.
C. H. KNUDSEN
1,505,149
WRIST PIN CONSTRUCTION
Filed July 1, 1922
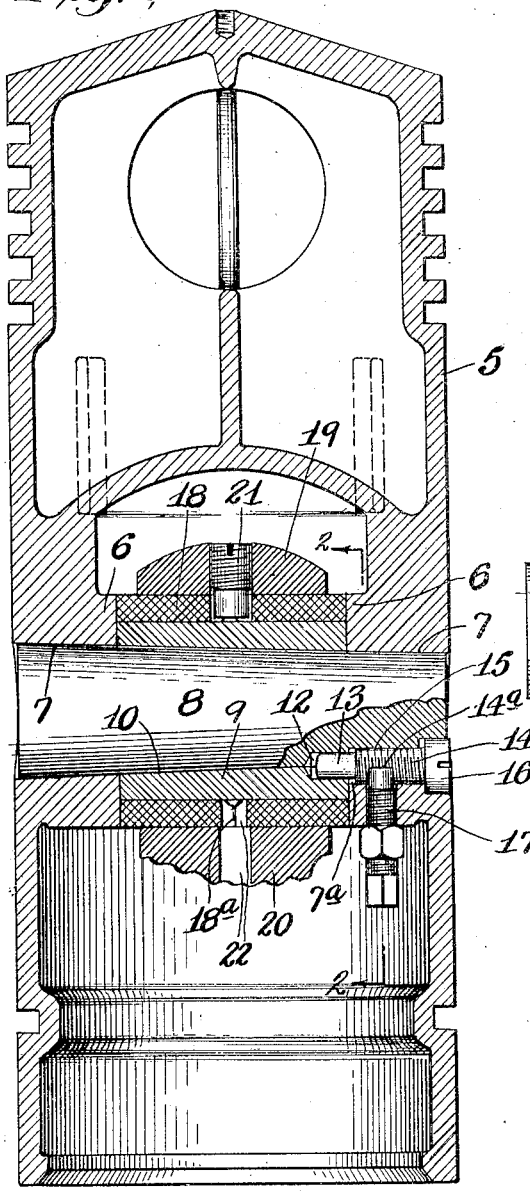
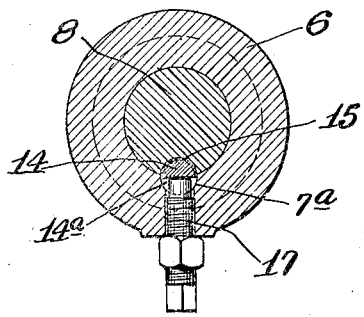
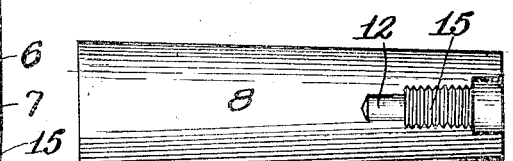
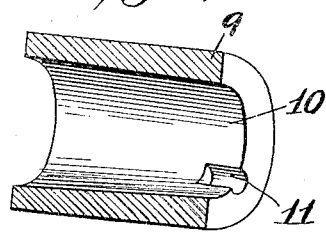
Inventor
Carl H. Knudsen
By his Attorneys Patented Aug. 19, 1924.

1,505,149

UNITED STATES PATENT OFFICE.

CARL H. KNUDSEN, OF BROOKLYN, NEW YORK, ASSIGNOR TO THE KNUDSEN MOTOR CORPORATION, OF WILMINGTON, DELAWARE, A CORPORATION OF DELAWARE.

WRIST-PIN CONSTRUCTION.

Application filed July 1, 1922. Serial No. 572,264.

*To all whom it may concern:*

Be it known that I, CARL H. KNUDSEN, a citizen of the United States, and residing at Brooklyn, in the county of Kings and State of New York, have invented certain new and useful Improvements in Wrist-Pin Constructions, of which the following is a specification, such as will enable those skilled in the art to which it appertains to make and use the same.

This invention relates to wrist-pin constructions of pistons and the like, and the object of the invention is to provide a construction of this class in which the wrist-pin is firmly secured in the piston and the wrist-pin bushing or sleeve firmly secured on said pin and keyed thereto to provide a long bearing surface for the Babbitt or other bearing metal mounted in connection with the connecting rod mounted on said wrist-pin construction; and with this and other objects in view the invention consists in a wrist-pin construction of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal sectional view through a piston showing my improved wrist-pin construction mounted therein and also showing a part of a connecting rod;

Fig. 2 a partial section on the line 2—2 of Fig. 1;

Fig. 3 a detail view of the wrist-pin which I employ; and,

Fig. 4 a perspective view of the wrist-pin bushing which I employ partially shown in section.

In Fig. 1 of the drawing, I have shown at 5 a piston having wrist-pin bosses 6, the apertures 7 of which are tapered to receive a tapered wrist-pin 8, and while I have shown a piston of specific construction, it will be understood that my invention may be applied to any type of piston.

Mounted upon the wrist-pin 8 between the bosses 6 is a sleeve 9, the bore 10 of which is tapered to correspond with the taper of the pin 8, as clearly shown in Fig. 1 of the drawing, and said sleeve is provided at one side thereof and in the bore thereof with a recess 11, and the wrist-pin 8 is provided with a similar recess 12 into which a key-pin 13 is adapted to be passed for keying the sleeve 9 to the wrist-pin, and this pin is threaded as shown at 14 and is free to pass through a recess $7^a$ in the bore of one of the bosses 6 and into a threaded portion 15 of the pin 8, and the head 16 is countersunk in said boss and wrist-pin. The key-pin 13 is adapted to be set in predetermined position of adjustment by a set screw 17 which passes through the boss 6 of the piston from within the piston structure, as clearly shown in Fig. 1 of the drawing and enters a transverse slot $14^a$ in the threaded part 14 of the pin 13.

In practice, the Babbitt or other bearing metal 18 which is secured to the head end 19 of a connecting rod 20 is adapted to be mounted upon the sleeve 9 as clearly shown in Fig. 1 of the drawing and a key-pin 21 is employed for keying the Babbitt or other bearing metal to the head 19, and oil or other lubricant is free to pass to the outer surface of the sleeve 9 through oil feed apertures 22 in the bearing 18 and through the connecting rod 20, and the Babbit or other bearing metal 18 is preferably split centrally as shown at $18^a$ to form two side portions.

It will be understood that if the wrist-pin or sleeve 19 thereon should become worn or a little play developed therein, this play may be taken up by removing the key-pin 13 and driving the wrist-pin 8 into firm engagement with the boss 6, which will also properly seat the sleeve 9 on said pin. With my improved construction it will be apparent that the Babbitt or other bearing metal has a bearing surface upon the entire face of the sleeve 9, and this will materially increase the life of said bearing and also provide a strong and rigid support for the connecting rod upon the wrist-pin, and while I have shown certain details of construction for carrying my invention into effect, it will be understood that I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A wrist-pin construction for pistons having tapered bosses comprising a tapered wrist-pin adapted to snugly fit the bores of said bosses, a sleeve mounted on and fixed to said wrist-pin and the bore of which is tapered to correspond with the taper thereof.

2. A wrist-pin construction for pistons having tapered bosses comprising a tapered wrist-pin adapted to snugly fit the bores of said bosses, a sleeve mounted on said wrist-pin within the piston and the bore of which is tapered to correspond with the taper thereof, and means for keying said sleeve to said wrist-pin.

3. A wrist-pin construction of the class described comprising a tapered wrist-pin, a sleeve mounted on said wrist-pin and the bore of which is tapered to correspond with the taper thereof, means for keying said sleeve to said wrist-pin, comprising a screw in threaded engagement with said wrist-pin, and a set screw cooperating with said key screw for securing the same against displacement.

4. In a wrist-pin construction of the class described, a tapered wrist-pin and a sleeve adapted to be mounted on said wrist-pin and the bore of which is tapered to correspond with the taper of said pin, and a key device in threaded engagement with said pin and adapted to operate in connection with key recesses in said pin and said sleeve for keying the same together.

5. In a wrist-pin construction of the class described, a tapered wrist-pin and a sleeve adapted to be mounted on said wrist-pin, the bore of which is tapered to correspond with the taper of said pin, a key device in threaded engagement with said pin and adapted to operate in connection with key recesses in said pin and said sleeve for keying the same together, and a set-screw cooperating with said key device for retaining the same in predetermined position.

6. The combination with a piston having wrist-pin bosses provided with tapered apertures, of a tapered wrist-pin adapted to be retained against movement in the apertures of said bosses, and means passed freely through one of said bosses and engaging said bosses said means adapted upon manipulation to draw said pin against the taper of the bosses for retaining said wrist-pin against displacement in the piston.

7. The combination with a piston having wrist-pin bosses provided with tapered apertures, of a tapered wrist-pin adapted to be retained against movement in the apertures of said bosses, means passed freely through one of said bosses and cooperating with said wrist-pin for retaining said wrist-pin against displacement in the piston, and a set screw for retaining said means in predetermined position.

8. The combination with a piston having wrist-pin bosses provided with tapered apertures, of a tapered wrist-pin adapted to be retained against movement in the apertures of said bosses, means passed freely through one of said bosses and cooperating with said wrist-pin for retaining said wrist-pin against displacement in the piston, a set screw for retaining said means in predetermined position, and a sleeve mounted on said wrist-pin between the bosses of said piston and the bore of which is tapered to correspond with the taper of said pin whereby said sleeve is firmly held in engagement with said pin.

9. The combination with a piston having wrist-pin bosses provided with tapered apertures, of a tapered wrist-pin rigidly retained in the apertures of said bosses, and a sleeve rigidly mounted on said pin between said bosses and the bore of which is tapered to correspond with the taper of said pin.

10. The combination with a piston having wrist-pin bosses provided with tapered apertures, of a tapered wrist-pin adapted to be rigidly retained in the apertures of said bosses, a sleeve adapted to be rigidly mounted on said pin between said bosses and the bore of which is tapered to correspond with the taper of said pin, and means passed freely through one of said bosses and in threaded engagement with said wrist-pin for retaining said wrist-pin in position.

11. The combination with a piston having wrist-pin bosses provided with tapered apertures, of a tapered wrist-pin adapted to be rigidly retained in the apertures of said bosses, a sleeve adapted to be rigidly mounted on said pin between said bosses and the bore of which is tapered to correspond with the taper of said pin, and means passed freely through one of said bosses and in threaded engagement with said wrist-pin for retaining said wrist-pin in position, and for keying said sleeve to said pin.

12. The combination with a piston having wrist-pin bosses provided with tapered apertures, of a tapered wrist-pin adapted to be rigidly retained in the apertures of said bosses, a sleeve adapted to be rigidly mounted on said pin between said bosses and the bore of which is tapered to correspond with the taper of said pin, means passed freely through one of said bosses and in threaded engagement with said wrist-pin for retaining said wrist-pin in position and for keying said sleeve to said pin, and means for retaining said last named means in a predetermined position.

In testimony that I claim the foregoing as my invention I have signed my name this 20th day of June 1922.

CARL H. KNUDSEN.